(12) United States Patent
Peltonen et al.

(10) Patent No.: US 6,369,215 B1
(45) Date of Patent: Apr. 9, 2002

(54) HYDROXYALKYLATED STARCH ESTER AND PREPARATION AND USE THEREOF

(75) Inventors: Soili Peltonen; Pertti Tiitola, both of Rajamäki (FI); Jani Vuorenpää, Marcq-En-Baroeul (FR); Harri Happonen; Pertti Törmälä, both of Tampere (FI)

(73) Assignee: Valtion teknillinen tutkimuskeskus, Espoo (FI)

( * ) Notice: Subject to any disclaimer, the term of this patent is extended or adjusted under 35 U.S.C. 154(b) by 0 days.

(21) Appl. No.: 09/331,972
(22) PCT Filed: Dec. 31, 1997
(86) PCT No.: PCT/FI97/00836
§ 371 Date: Aug. 19, 1999
§ 102(e) Date: Aug. 19, 1999
(87) PCT Pub. No.: WO98/29456
PCT Pub. Date: Jul. 9, 1998

(30) Foreign Application Priority Data

Dec. 31, 1996 (FI) .................................. 965304

(51) Int. Cl.$^7$ .................. C08B 31/02; C08B 31/16; C08B 37/00; C08B 31/00; C07H 1/00
(52) U.S. Cl. .................. 536/108; 536/102; 536/107; 536/110; 536/124
(58) Field of Search ............................ 536/102, 108, 536/110, 124, 107

(56) References Cited

U.S. PATENT DOCUMENTS

| | | |
|---|---|---|
| 3,033,853 A | 5/1962 | Klug ........................ 260/233.3 |
| 3,824,085 A | 7/1974 | Teng et al. |
| 3,883,666 A | 5/1975 | Teng et al. ..................... 426/3 |
| 4,041,179 A | 8/1977 | Stubits et al. .................. 426/3 |
| 4,067,824 A | 1/1978 | Teng et al. ................ 252/522 |
| 4,193,989 A | 3/1980 | Teng et al. ................... 424/60 |
| 4,305,572 A | 12/1981 | Elliot ......................... 254/414 |
| 4,383,988 A | 5/1983 | Teng et al. ................... 424/68 |
| 4,452,978 A * | 6/1984 | Eastman .................... 536/111 |
| 4,997,581 A | 3/1991 | Williamson et al. ..... 252/8.551 |
| 5,321,132 A | 6/1994 | Billmers et al. ............. 536/48 |
| 5,360,845 A | 11/1994 | Billmers et al. ............. 524/51 |

* cited by examiner

Primary Examiner—Gary Geist
Assistant Examiner—Everett White
(74) Attorney, Agent, or Firm—Birch, Stewart, Kolasch & Birch, LLP

(57) ABSTRACT

The invention concerns a hydroxypropyl starch ester (HPS ester), compositions containing it, and a process for the preparation thereof. According to the invention, the molar substitution in the HPS ester is 2 at the most and the substitution degree in the ester group is at least 1. The HPS ester is prepared by hydroxypropylating a starch-containing base material in an aqueous alkanol medium. A starch component can be prepared of the HPS ester containing 90 to 60% by weight HPS ester and 10 to 40% by weight of a plasticizer. Compositions which are suited for, e.g., coating board or paper and for use as a component in labelling adhesives or paint, can be made from the starch component by combining it with auxiliaries known as such within the polymer and plastics technology.

Figure 1A:
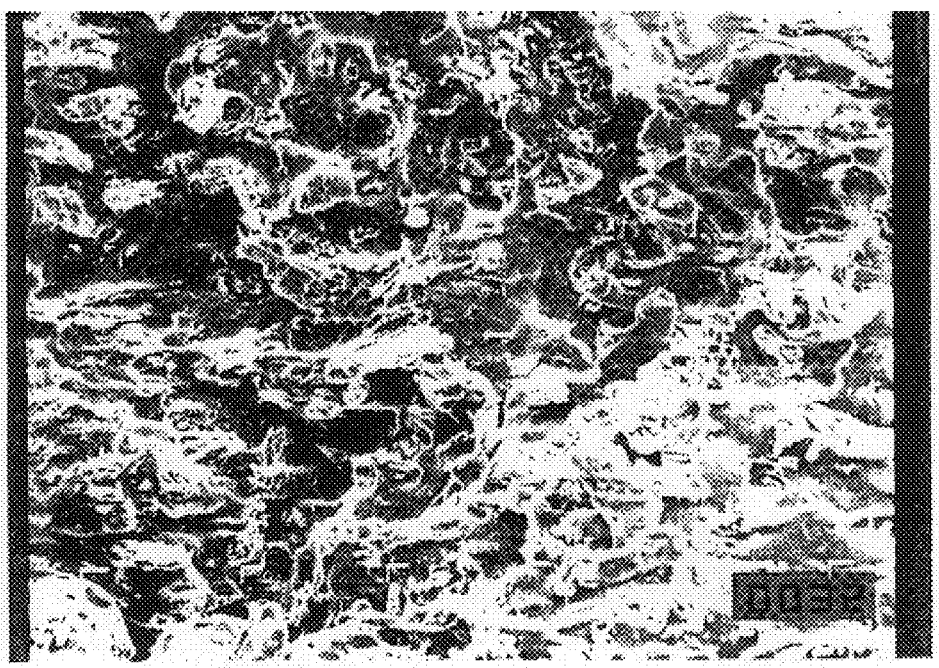

22 Claims, 1 Drawing Sheet

HYDROXYALKYLATED STARCH ESTER AND PREPARATION AND USE THEREOF

This application is the national phase under 35 U.S.C. §371 of prior PCT International Application No. PCT/FI97/00836 which has an International filing date of Dec. 31, 1997 which designated the United States of America.

The present invention relates to a hydroxyalkylated starch ester which is a hydroxypropyl starch ester, comprising an ester group derived from acetic acid, propionic acid or butyric acid or from a mixture thereof, the molar substitution of the hydroxypropyl group being 1.4 at the most and the degree of substitution of the ester group at least 1.

The invention also relates to a thermoplasticized starch component containing 90 to 60% by weight of a hydroxypropyl starch ester whose hydroxypropyl group has a molar substitution of up to 2 and whose ester group has a degree of substitution of at least 1, and 10 to 40% by weight of a plasticizer. This thermoplasticized starch may also have additives known as such within the fields of polymer and plastics technology. The invention also relates to a process for preparing a hydroxyalkylated starch ester wherein the starch-containing base is hydroxypropylated and esterified, characterized in that the hydroxypropylation is performed in an aqueous alkanol medium containing 10 to 95% by weight of a lower alkanol, 5 to 90% by weight of water and 0.1 to 10% by weight of a catalyst.

The current emphasis on an environmentally friendly attitude and green values is opening up new markets for products based on renewable natural resources. Such trends can be seen within the sectors of, e.g. the packaging industry, the sanitary industry and the glue industry, where recyclability, reuse, compostability, biodegradability and lack of environmental strain are demands of today. The trend of replacing products based on petrochemistry by processed biopolymer products is also emphasized. Starch and its derivatives constitute a particularly interesting initial material for the preparation of biodegradable polymer products.

Of industrially usefull starch derivatives, particularly starch esters and ethers may be mentioned, as well as mixed ester-ethers of starch, containing both ester and ether groups. The latter are represented by hydroxyalkylated starch esters which have been described, among others, in U.S. Pat. Nos. 4,997,581, 4,193,989, 4,041,179, 4,035,572 3,883,666, 5,360,845, 4,383,988, 4,067,824, 4,035,572 and 3,824,085.

The most important among hydroxyalkylated starch esters are hydroxypropylated derivatives because they can be prepared in room temperature using a liquid material, propylene oxide (1,2 epoxy propane) which reacts easily with the hydroxy groups of starch whereby an ether of starch and 1- and 2-propoxy groups is formed. Other hydroxyalkylated derivatives can be prepared from other corresponding epoxy alkane compounds. Unreacted hydroxyl groups can be esterified further by means of an esterifying agent whereby the corresponding acyl groups are obtained. As the alkylene oxide groups in connection with alkoxylation easily react with one another forming an oligomer, several alkylene oxide residues may be attached to each etherified hydroxyl group. Therefore, the number of hydroxy alkyl groups is given as the molar substitution degree (MS) of the glucose unit, the MS typically varying between 3 and 6. The number of starch ester groups in the glucose unit, that is, the degree of substitution (DS), is 3 at the most.

In the prior art, hydroxypropyl starch acetate has mainly been used as a basic material for chewing gum (e.g., U.S. Pat. No. 4,041,179, U.S. Pat. No. 4.035.572 and U.S. Pat. No. 3,883,666) and as a gelling agent or, rather, an agent which increases the viscosity of the blend in suntan lotions, perfumes, antiperspirants or in organic solvents in general (e.g. U.S. Pat. No. 3,824,085, U.S. Pat. No. 4,067,824, U.S. Pat. No. 4,383,988 and U.S. Pat. No. 4,193,989). Typically, hydroxypropyl starch acetate can be used as a basic material for chewing gum, the DS thereof being 0.5–0.92 and its MS=3–6 (U.S. Pat. No. 4,041,179), or DS=1 –2.5 (1.3–1.65) and MS=3–6 (4.4–4.5) (U.S. Pat. No. 3,883,666).

In the above-described uses the hydroxypropyl starch acetate is typically prepared by allowing the starch dispersed in an organic solvent (preferably toluene) to react with propylene oxide in the presence of NaOH, whereafter the reaction is continued with an acetic acid anhydride. Next, excess toluene is removed by distillation from the toluene/rubber blend, the final product is dissolved in chloroform or ethanol and the purified rubber is precipitated from hexane or water and dried.

By way of summarizing the prior art solutions it can be observed that known hydroxy-alkylated starch esters are not suitable for use as raw materials of compostable starch bioplastics; for that use, they are too glutinous and difficult to mould. In addition, the above-described methods for preparing hydroxypropyl starch acetate are not particularly environmentally friendly, among other reasons because carcinogenic organic solvents are used.

The present invention aims at removing the drawbacks of the prior art and at achieving a new starch derivative as a raw material for starch plastics. A further aim of the invention is new starch derivative as a raw material for starch plastics. A further aim of the invention is to provide a new method for the preparation thereof and to achieve new thermoplasticized starch components and compositions. The invention also relates to the use of these products.

The invention is based on the concept of hydroxyalkylating the starch to a relatively low molar substitution degree and esterifying it to as high a substitution degree as possible, whereby a thermoplasticizable hydroxyalkyl starch ester is obtained which behaves in the manner of plastics. According to the invention, the MS of a hydroxyalkylated starch ester is smaller than 2 and its DS is greater than 1; thus, the MS of hydroxypropyl starch acetate is typically 0.05 to 1.2 and its DS is 1.5 to 3. The hydroxyalkylated starch esters can be mixed with plasticizers whereby a thermoplasticized starch component is obtained containing 90 to 60% by weight of a starch derivative and 10 to 40% by weight of a plasticizer. A useful composition may be formed of the starch component by admixing it with auxiliaries and additives known as such.

By means of the invention, it is possible to obtain a new process for preparing an esterified starch ether used as a raw material for starch-based bioplastics. It is characteristic of the process that starch is etherified in an aqueous alkanol medium in the presence of a catalyst, whereafter the product is filtered and the alcohol is evaporated. After the evaporation of alcohol the hydroxypropyl starch is esterified, washed and dried.

In more detail, the thermoplasticized starch derivative according to the invention is a hydroxypropyl starch ester, comprising an ester group derived from acetic acid, propionic acid or butyric acid or from a mixture thereof, the molar substitution of the hydroxypropyl group being 1.4 at the most and the degree of substitution of the ester group at least 1.

The thermoplasticized starch component according to the invention then, is characterized as containing 90 to 60% by weight of a hydroxypropyl starch ester whose hydroxypropyl group has a molar substitution of 2 at the most and whose ester group has a degree of substitution of at least 1, and 10 to 49% by weight of a plasticizer. This thermoplasticized starch may also have additives known as such within the fields of polymer and plastics technology.

The process according to the invention for preparing a starch derivative is a process for preparing a hydroxyalkylated starch ester wherein the starch-containing base is hydroxypropylated and esterified, characterized in that the hydroxypropylation is performed in an aqueous alkanol medium containing 10 to 95% by weight of a lower alkanol, 5 to 90% by weight of water and 0.1 to 10% by weight of a catalyst.

Considerable benefits are provided by the invention. Thus, the above-described raw materials of the starch-based bioplastics and dispersion according to the invention are mainly based on renewable natural resources and are biodegradable/compostable. The starch component may be derived from any native starch; it need not be, for instance, a starch rich in amylose.

The derivative described herein, when thermoplasticized, has excellent elasticity, melt strength and adhesion properties, and it is easily thermoplasticized. In this respect, it is clearly more advantageous than starch esters. Thus, it is characteristic of the plasticized derivative that its elasticity/elongation is significantly better than e.g. the corresponding properties of a thermoplasticized starch ester. In addition, the adhesion properties of the thermoplasticized starch component, i.e. the esterified starch ether, onto paperboard, paper and other surfaces such as glass, are clearly better than those of a thermoplasticized starch ester.

The plasticized starch derivative can be used within fields of application typical of polymers which are elastic and strong in the molten state, such as in the coating of board and paper, in blown films and films, and it can be used to manufacture injection moulded products. It is possible to process the plasticized starch derivatives and to turn them into products by any method known as such within the polymer technology. In addition, one field of use covers fibres and non-woven fabrics.

According to a preferred embodiment, a dispersion may be produced of the esterified starch ether by plasticizing it and by dispersing the plasticized derivative into water by means of dispersion auxiliaries known as such. No solvents which need to be evaporated are needed for the formation of the dispersion; instead, the dispersion can be performed by means of a melt-processing apparatus. The films formed of the dispersion are water-repellent and can be used to improve the water resistance of paper or board by at least 40 to 50%. The new polymer dispersions may be used for coating paper or board, as a primer or as a component in labelling adhesives or paint. They are also suited for the production of hydrophobic cast films and as binders in materials based on cellulose fibres.

In the following, the present invention is examined in more detail by the aid of a detailed description and a few working examples.

Figure 1B:
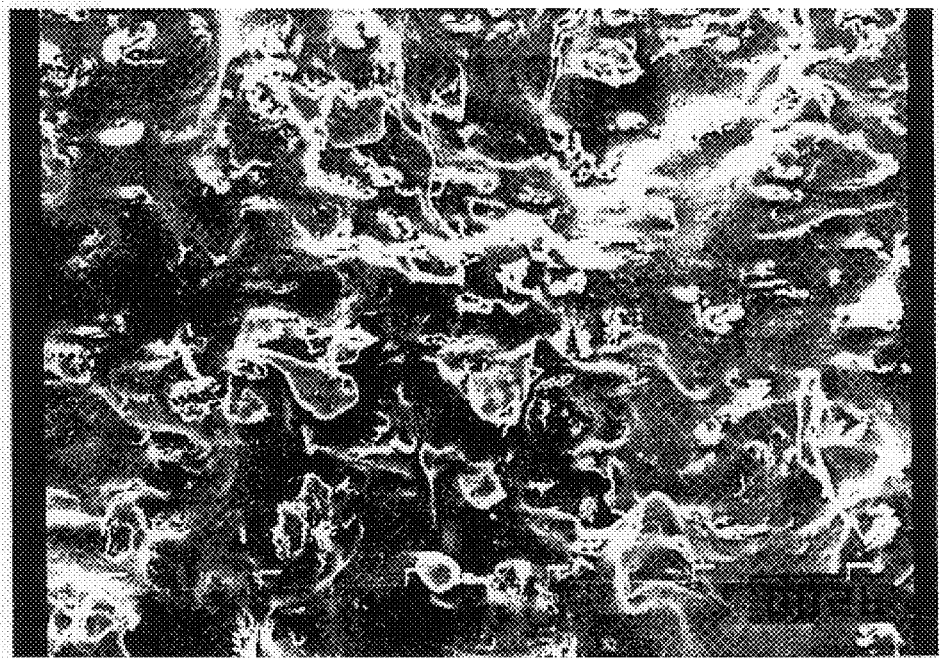

Of the annexed figures, FIG. 1a is a scanning electron microscope picture of the fracture surface of a starch/acetate/cellulose fibre composite (C) and FIG. 1b is a corresponding picture of the fracture surface of an HPS/acetate/cellulose fibre composite (D) (204×magnification).

In the context of the present invention, the term "thermoplasticized starch component" is used to refer to a combination which can be prepared from an esterified starch ether and which can be moulded at moderate temperatures and pressures by means of plastic processing apparatuses.

The thermoplasticized/thermoplasticizable starch derivative according to the invention may be based on any native starch having an amylose content of 0 to 100% and an amylopectin content of 100 to 0%. Thus, the starch may be derived from barley, potato, wheat, oat, peas, maize, tapioca, sago, rice, or a similar tuber-bearing or grain plant. It can also be based on starches prepared from said native starches by oxidizing, hydrolyzing, cross-linking cationizing, grafting, or by means of an enzymatic treatment.

The starch derivative according to the invention is advantageously an esterified starch ether, preferably a hydroxy propyl starch acetate whose hydroxy propyl groups have a molar degree of substitution (MS) of 1.4 at the most and the ester group has a degree of substitution (DS) of at least 1.5. The MS is particularly advantageously about 0.05 to 1, preferably about 0.3 to 0.7, and the degree of substitution in the ester group is 2.5 to 3.

According to a particularly preferred embodiment, hydroxy propyl starch acetate is prepared whose hydroxy propyl groups have a molar substitution degree of 0.4 to 0.6, the acetate groups having a substitution degree of 2.5 to 2.95.

The ester groups of the derivative may be derived from one or several aliphatic $C_{2-24}$ carboxyl acids, anhydrides of these acids or acid chlorides or similar reactive derivatives. Thus, the carboxyl acid component in the ester may be derived from a lower alkane acid, such as acetic acid, propionic acid or butyric acid or a mixture thereof. The carboxyl acid component may, however, also be derived from a saturated or an unsaturated native fatty acid. As examples of these, palmitinic acid, stearic acid, oleic acid, linoleic acid and mixtures thereof may be mentioned. The ester may also be composed of both long- and short-chain carboxyl acid components. As an example, a mixed ester of acetate and stearate may be mentioned.

The starch derivative according to the invention is prepared by a two-phase method by first hydroxyalkoxylating one of the above-described starches by means of a corresponding etherifying agent in the presence of a catalyst, whereafter the hydroxyalkyl starch obtained is esterified by means of an esterifying agent.

In connection with the invention it has been found that the desired low MS value of the product is attained by performing the hydroxypropylation in alkanol because this does not essentially gel the starch, whereby the reaction takes place without degradation of the granular structure of the starch.

Thus, in connection with the hydroxypropylation, a slurry is formed in the reaction mixture, in which the reactions take place in the surface layer of the starch granule. The first phase is carried out in an aqueous alkanol medium, in particular a medium containing 10 to 95% by weight of a lower alkanol, 5 to 90% by weight of water and 0.1 to 10% by weight of a catalyst.

The alkanol used is preferably methanol, ethanol, propanol, isopropanol, or n-butanol. The catalyst comprises a water-soluble, alkaline hydroxide compound such as sodium, potassium or ammonium hydroxide.

The hydroxypropoxylation is advantageously carried out at an elevated temperature. It has been found that a particularly preferred temperature, depending on the alkanol used, lies within the range from about 60 to 80° C.

The hydroxypropoxylation is continued until the molar degree of substitution of the hydroxypropyl groups is 1 at the most. The reaction can be interrupted at the desired MS value by cooling the reaction mixture, by adding alkanol, by neutralizing the base or by adding propylene oxide into the initial mixture in an amount only which corresponds to the desired MS value.

An ester is prepared from the hydroxyalkylated starch in a manner known as such.

The preparation of the fatty acid esters of starch is performed, for instance, in the manner described in the following publications relevant in the field: Wolff, I. A., Olds. D. W. and Hilbert, G. E., The Acylation of Corn Starch, Amylose and Amylopectin, J. Amer. Chem. Soc. 73 (1952) 346–349, or Gros, A. T. and Feuge, R. O., Properties of Fatty Acid Esters of Amylose, J. Amer. Oil Chemists' Soc 39 (1962) 19–24.

Starch acetates may be prepared by allowing the starch to react with acetanhydride in the presence of a catalyst. As the catalyst, for example a 50% sodium hydroxide is used. Even other known methods described in the literature for preparing acetates are suited for the preparation of starch acetate. By varying the amount of acetic acid anhydride, the amount of the base used as the catalyst, and the reaction time, starch acetates having different degrees of substitution can be prepared.

To cite an example of an advantageous thermoplasticized starch-based composition a composition may be mentioned containing hydroxypropyl starch acetate and plasticizer. Even this kind of composition has an elasticity or tensility which is at least 65 times better than that of plasticized starch acetate.

The hydroxyalkylated starch ester is plasticized by admixing it with a softener or plasticizer known as such. Therefore, the thermoplastic starch-based composition is advantageously made to contain 0.01 to 95% by weight, advantageously about 1 to 50% by weight and preferably about 10 to 40% by weight of a plasticizer. Any known plasticizers can be used, examples thereof including the following: triacetin, diacetin, monoacetin, triethyl citrate, tributyl citrate, acetyl triethyl citrate, acetyl tributyl citrate, dimethyl succinate, diethyl succinate, ethyl lactate, methyl lactate, fatty acid esters of glycerol, castor oil, olive oil, rapeseed oil, pine oil, dibutyl phthalate, diethyl phthalate, and mixtures thereof.

In addition to plasticizers, starch compositions may contain other additives and auxiliaries known as such within the field of polymer and plastics technology, such as lubricators, antistatic agents, colorants, pigments, fire retardants and reinforcing and filling agents. These additives and auxiliaries are present in an amount of about 1 to 95% of the weight of the composition, typically 10 to 50%. As regards the auxiliaries, particularly the following may be mentioned: waxes (e.g. alkylketene dimer wax (AKD) or beeswax, cf below), reinforcing agents (see below) and fillers, such as titanium dioxide, calcium carbonate, kaolin, aluminium hydroxide, sodium silicoaluminate, barium sulphate and zinc oxide.

Starch dispersion constitutes a particularly advantageous starch composition. In order to prepare it, a plasticized starch ether ester is added to water by the aid of a dispersion auxiliary, whereby the plasticized polymer melt can be dispersed in water in sufficiently fine particles in order to form a stable dispersion. Examples of dispersion auxiliaries include polyvinyl alcohol (PVA), particularly PVA having a weight-average molar mass of approximately 10,000 to 115,000. Other dispersion auxiliaries (protective colloids) include cationic starch and hydroxyalkyl starch which may be used separately or together with PVA. Furthermore, as additives or auxiliaries, the dispersions may contain alkylketene dimer (AKD) wax and beeswax.

Depending on the intended use, such a polymer dispersion can further be made to contain 0.01 to 30% by weight, preferably about 5 to 30% by weight of a cellulose ester, such as cellulose acetate, cellulose propionate or cellulose butyrate, or mixed esters thereof.

According to an embodiment the present dispersion compositions are prepared by dispersing the plasticized polymer melt in water using auxiliaries. In order to achieve plasticizing the biodegradable polymer is admixed with a plasticizer preferably at an elevated temperature in order to form a melt. On a small scale the plasticization can be carried out in e.g. a flask equipped with a reflux condenser and having efficient agitation. The temperature varies depending on the plasticizer used but is typically about 50 to 250° C., preferably about 100 to 200° C. On a larger scale, plasticization is advantageously performed in a melt-processing apparatus, such as an extruder.

The plasticized melt is dispersed in a liquid phase, usually water, using auxiliaries. Water is considered a particularly advantageous dispersion medium according to the invention but the invention can also be applied to various kinds of solvents.

According to another advantageous embodiment the dispersions are prepared by mixing together the HPS ester, the plasticizer, the dispersion auxiliaries and a part of the amount of water used for preparing the dispersion. The mixture is heated to obtain a paste-like composition whereafter the paste is dispersed in the remaining amount of water.

Plasticized starch ether ester compositions according to the invention may contain 1 to 95, advantageously about 5 to 45% by weight of fibrous material which serves to reinforce the material and simultaneously produces discontinuity interfaces enhancing the absorption of water. The fibrous material is added to the rest of the material at any stage, but not later than during the manufacturing process of the semi-finished product or the product. By way of exemplifying the biodegradable fibres which may be used in the invention, organic fibres, inorganic fibres and mixtures thereof may be cited. The fibrous material advantageously comprises fibres of a lactic-acid-based polymer (e.g. polylactide fibres), cellulose pulp (e.g. pine-based pulp), cellulose fibre material from corn (e.g. cellulose fibre material from the husk of barley corn), pentosan from corn (e.g. pentosan from the husk of barley corn), cotton linters, fibres of Abaca hemp, sisal fibres, ramie fibres, flax fibres, jute fibres, or biodegradable glass fibres. Of the organic fibre materials, cellulose fibres will improve the impact resistance values of the compositions by about 10 to 100% (as compared to an unstrengthened composition), other plant-based fibres by about 50 to 150%, and hydroxy acid polymer fibres by about 200 to 600%. The impact resistances of biodegradable glass fibres are improved by about 200 to 300%.

The following noniniiting examples are provided by way of illustrating the invention. The substitution degrees of the starch acetates cited in the examples are determined in accordance with Wurzburg (Wurzburg, O. B, Acetylation, in: Methods in Carbohydrate Chemistry, Vol. IV, ed. R. L. Whistler, Academic Press, New York and London, 1964, p. 288). The molar masses, then, have been determined by GPC analysis in the research laboratory of Alko Yhtiöt Oy. The equipment used was HP-1090, two in a column series (Waters, Ultra Hydrogel 2000), solvent 50 nM NaOH, temperature 40° C., dextran standards, as detectors RI and viscosity detectors. The molar mass has been determined from the starch used as the base material.

EXAMPLE 1
Enzymatically Hydrolyzed Starch

An enzymatically hydrolyzed starch suited for the preparation of starch esters is obtained by adding thermo-a-amylase into an aqueous slurry of the starch, whereafter the slurry is passed through a jet cooker whereby vapour is added. The enzyme is allowed to act until the starch is sufficiently degraded. The process is monitored by measuring the viscosity of the slurry. When the desired viscosity has been attained, the enzyme is inactivated and the starch is dried.

EXAMPLE 2
Preparation of Hydroxypropyl Starch Acetate by Propoxylating Starch in an Aqueous Solution Hydroxypropyl starch acetates with different degrees of molar substitution (M.S.) in the hydroxypropyl group and degrees of substitution (D.S.) in the acetyl groups were prepared by using the amounts of reagent cited in the table below. Table 1 indicates the amounts of reagent required for the hydroxypropoxylation.

TABLE 1

Amounts of reagent required for hydroxypropoxylation and product analyses

| Test No. | Starch, [g] | Water, [g] | NaOH, [g] | PO, [g] | M.S. |
| --- | --- | --- | --- | --- | --- |
| 1 | 75 | 250 | 2.1 | 2.8 | 0.07 |
| 2 | 75 | 250 | 2.1 | 20.7 | 0.5 |
| 3 | 75 | 250 | 2.I | 58.5 | 1.3 |

PO = propylene oxide

The hydroxypropoxylation of starch was carried out in an aqueous solution by first feeding water and NaOH into the reactor and then adding the starch. As initial starch material, the enzymatically hydrolyzed barley starch of Example 1 was used. POs were added to the pressurized reactor (in the test 3 PO were introduced in several batches) and the temperature was increased to 60° C. During the adiabatic temperature rise, the temperature of the reaction mixture was maintained at 70° C. by cooling. Depending on the amount of PO, the reaction duration in the tests was 2 to 4 h (=time lapsed before all of the PO had reacted) whereafter excess water was removed from the product by evaporation.

The hydroxypropyl starch obtained after the evaporation of excess water was acetylized with the amounts of reagent indicated in Table 2.

TABLE 2

Amounts of reagent required for acetylation and final product analyses

| Test No. | HPS, [g] (M.S.) | Acetanhydride, [g] | NaOH, [g] | M.S. | D.S. |
| --- | --- | --- | --- | --- | --- |
| 4 | 50 | 175 | 3.75 | 0.07 | 1.3 |
| 5 | 50 | 175 | 3.75 | 0.07 | 2.6 |
| 6 | 50 | 175 | — | 0.5 | 0.84 |
| 7 | 50 | 175 | — | 0.5 | 2.91 |
| 8 | 50 | 175 | — | 1.3 | 1.1 |
| 9 | 50 | 175 | — | 1.3 | 1.84 |

In the process of Example 1 (acetylation process 1) the acetylation of the hydroxypropyl starch was carried out such that the HPS and acetanhydride were placed in a reactor equipped with a reflux condenser. The temperature of the mixture was raised to 60° C. and then NaOH was added to catalyze the reaction (with HPS's having a high M.S, no catalyst is required). After adding NaOH, the temperature of the reaction mixture was raised to 125° C. and kept at that value for 1 to 5 h depending on the desired D.S. Excess acetanhydride also acted as solvent in the reaction, i.e. as reaction medium. After the reaction the product was precipitated from the water and dried.

The hydroxypropyl starch prepared according to Example 2 could also be acetylized by means of another process (acetylation process 2) wherein HPS and NaAc, sodium acetate, used as catalyst, were added to the initial charge of acetic acid and acetanhydride in the reactor. The mixture was heated until the HPS was gelatinized. The reaction heat thus formed was removed by cooling or by means of a condenser (temperature of reaction mixture <135° C.). When the initial acetanhydride had reacted, the rest of the acetanhydride required was introduced. The reaction temperature was maintained at 125 to 135° C. for approximately 5 h until all of the acetanhydride had reacted. The product was precipitated from water and dried. Table 3 lists the reagents required for acetylation and end product analyses.

In Test 10, precipitation could also be carried out from ethanol. Generally speaking, the precipitation of hvdroxypropyl starch acetates having a high M.S. and a low D.S. can be earied out using ethanol, ether, or acetone.

TABLE 3

Amounts of reagent required for acetylation and end product analyses

| Test No. | HPS, [g] | Acetic acid, [g] | Acetanhydride, [g] | NaAc, [g] | M.S. | D.S. |
| --- | --- | --- | --- | --- | --- | --- |
| 10 | 70 | 70 | 112.1 | 3.5 | 0.4 | 2.9 |

NaAc = sodium acetate

EXAMPLE 3

Preparation of Hydroxypropyl Starch Acetate by Propoxylation in an Alcohol Suspension Hydroxypropyl starch acetates with different degrees of molar substitution (M.S.) in the hydroxypropyl group and degrees of substitution (D.S.) in the acetyl groups were prepared by using the amounts of reagent depicted in the table below. Table 4 indicates the amounts of reagent required for the hydroxypropoxylation.

TABLE 4

Amounts of reagent required for hydroxypropoxylation and product analyses

| Test No. | Starch, [g] | Water, [g] | Ethanol, [g] | NaOH, [g] | PO, [g] | M.S. |
| --- | --- | --- | --- | --- | --- | --- |
| 11 | 104.9 | 45.1 | 152.1 | 3.1 | 8 | 0.13 |
| 12 | 104.9 | 45.1 | 152.1 | 3.1 | 32.3 | 0.5 |
| 13 | 104.9 | 45.1 | 152.1 | 3.1 | 95 | 1.3 |

PO = propylene oxide

In the process of Example 3, the hydroxypropoxylation of starch was carried out in an alcohol suspension such that the alcohol (here ethanol), water and NaOH were intermixed in a reactor. After introducing starch and PO the mixture was heated to 65° C. and kept at that temperature for 24 h. After the reaction the product was filtered and excess ethanol was evaporated. The HPS obtained was acetylized by acetylation process 2 according to Example 2. Table 5 lists the reagents required for acetylation with end product analyses.

TABLE 5

Reagents required for acetylation with end product analyses

| Test No. | HPS, [g] | Acetic acid, [g] | Acetanhydride, [g] | NaAc, [g] | M.S. | D.S. |
|---|---|---|---|---|---|---|
| 14 | 70 | 70 | 67.3 | 3.5 | 0.5 | 1.8 |
| 15 | 70 | 70 | 106.2 | 3.5 | 0.5 | 2.84 |

NaAc = sodium acetate

The acylation of HPS prepared according to Example 3 can also be carried out using the acetylation process 1 of Example 2.

EXAMPLE 4
Preparation of a Hydroxypropyl Starch Acetate by Propoxylating Starch in an Aqueous Suspension Hydroxypropyl starch acetates with different degrees of molar substitution (M.S.) in the hydroxypropyl group and degrees of substitution (D.S.) in the acetyl groups were prepared by using the amounts of reagent indicated in the table below. Table 6 shows the amounts of reagent required for the hydroxypropoxylation.

TABLE 6

Amounts of reagent required for hydroxypropoxylation and product analyses

| Test No. | Starch, [g] | Water, [g] | $Na_2SO_4$, [g] | NaOH, [g] | PO, [g] | M.S. |
|---|---|---|---|---|---|---|
| 16 | 120 | 180 | 4.8 | 1.4 | 6.1 | 0.08 |
| 17 | 120 | 180 | 8.4 | 1.4 | 11.5 | 0.15 |

PO = propylene oxide
M.S. = molar substitution

The hydroxypropoxylation of starch was carried out such that water and NaOH were introduced into the reactor whereafter salt and starch were added under intense stirring. PO was pumped into the reactor under a slight excess pressure. The reaction temperature was maintained at 40° C. for 24 h whereafter the suspension was filtered and washed with a 1% by weight $Na_2SO_4$ solution. Excess water was removed from the product by evaporation. The product obtained was then acetylized by acetylation method 2 according to Example 2. Table 7 shows the amounts of reagent required for the acetylation and the final product analyses.

TABLE 7

Amounts of reagents required for acetylation and final product analyses

| Test No. | HPS, [g] | Acetic acid, [g] | Acetanhydride, [g] | NaAC, [g] | M.S. | D.S. |
|---|---|---|---|---|---|---|
| 18 | 70 | 70 | 104.7 | 7 | 0.08 | 2.8 |

The acetylation of HPS can also be performed using acetylation method 1 according to Example 1.

EXAMPLE 5
Preparation of a Hydroxypropyl Starch Acetate by Combined Enzymatic Starch Hydrolysis and Propoxylation in an Aqueous Solution Hydroxypropyl starch acetates with different degrees of molar substitution (M.S.) in the hydroxypropyl group and degrees of substitution (D.S.) in the acetyl groups were prepared by using the amounts of reagent indicated in the table below. Table 8 shows the amounts of reagent required for the hydroxypropoxylation.

TABLE 8

Reagent amount required for hydroxypropoxylation and product analyses

| Test No. | Starch, [g] | Water, [g] | Enzyme, [g] | $CaCl_2$, [g] | NaOH, [g] | PO, [g] | M.S. |
|---|---|---|---|---|---|---|---|
| 19 | 105 | 190 | 0.1 | 0.031 | 2.9 | 25 | 0.5 |
| 20 | 105 | 190 | 0.1 | 0.031 | 2.9 | 42 | 0.8 |
| 21 | 105 | 190 | 0.1 | 0.031 | 2.9 | 65 | 1.2 |

The starch was hydroxypropoxylated by slurrying the starch in water in the reactor and by adjusting the pH of the aqueous slurry such that it was suitable (pH 6.0 to 6.5) for the amylase enzyme used. Next, the $CaCl_2$ and enzyme were added into the reactor and the reactor was heated to 100° C. as quickly as possible, whereby the enzyme was deactivated. After hydrolysis, the mixture was cooled to 55° C. whereby an initial PO charge was pumped into the closed reactor. During an adiabatic temperature rise the temperature in the reactor was kept at 70° C. by cooling. When the pressure started to decline the rest of the PO was added into the reactor. The reaction time in the tests, depending on the PO, was 2 to 4 hours (time lapsed before all of the PO had reacted), whereafter excess water was removed from the product by evaporation. The UPS obtained was acetylized by acetylation process 1 according to Example 2. Table 9 cites the amounts of the reagents required for the acetylation with final product analyses.

TABLE 9

Amounts of reagents required for acetylation and analyses of final products

| Test No. | HPS, [g](M.S.) | Acetanhydride, [g] | NaOH, [g] | M.S. | D.S. |
|---|---|---|---|---|---|
| 22 | 50 | 175 | — | 0.8 | 1.2 |
| 23 | 50 | 175 | — | 0.8 | 2.4 |

The acetylation of the HPS prepared in accordance with this example can also be performed by acetylation process 2 according to Example 2.

EXAMPLE 6
Plasticization of a Hydroxyalkylated Starch Ester with Different Plasticizers and Elasticity of Planar Films Made Therefrom as Compared to Other Starch Derivatives As the hydroxyalkylated starch ester, hydroxypropyl starch acetate (MS=0.4 and DS=2.9) prepared according to Example 2 was used and it was plasticized using the plasticizers and the amounts of plasticizer indicated in Table 11.

The plasticizations were carried out in a Brabender Plasticorder® PL2000 W50E melt mixer under the following conditions:

| Temperatures: | 165° C. (all zones) |
|---|---|
| Rotation velocity of blades: | 50 l/min |
| Agitation time: | 10 to 20 min |

The thus obtained plasticized hydroxypropyl starch acetate was worked into planar films (152,4*152,4*0,5 mm) using a compression press at 170° C.

Test pieces with the dimensions 80*12*0,5 mm were cut of the compression-moulded planar films and their elongation was tested by adapting the ASTM D 882-9 Standard Test Method for Tensile Properties of Thin Plastic Sheeting.

Table 11 presents the elongation values which have been compared with the elongation values of planar films made from the starch acetates of Patent Applications Nos. FI 953409 and PCT/FI96/00403 using the above-described processes.

Table 10 indicates the properties of the starch derivatives described in Table 11.

TABLE 10

Properties of the starch derivatives used

| Starch derivative | Base starch | MS | DS |
|---|---|---|---|
| Hydroxypropyl starch acetate | Native barley starch | 0.4 | 2.9 |
| Starch acetate 1 | Native barley starch | — | 2.6 |
| Starch acetate 2 | Hydrolyzed barley starch | — | 2.9 |

TABLE 11

Elongation properties of starch derivatives plasticized with different plasticizers

| Starch derivative [% by w.] | Plasticizer [% by w.] | Elongation [%] |
|---|---|---|
| Hydroxypropyl starch acetate, [70% by w.] | Triacetin, [30% by w.] | 204.6 |
| Hydroxypropyl starch acetate, [70% by w.] | Triethyl citrate, [30% by w.] | 185.8 |
| Hydroxypropyl starch acetate, [70% by w.] | Acetyl triethyl citrate, [30% by w.] | 85.95 |
| Starch acetate 1 (DS = 2.6), [70% by w.] | Triacetin, [30% by w.] | 3.11 |
| Starch acetate 1 (DS = 2.6), [70% by w.] | Triethyl citrate, [30 by w.] | 2.64 |
| Starch acetate 1 (DS = 2.6), [70% by w.] | Acetyl triethyl citrate, [30% by w.] | 0.93 |
| Starch acetate 2 (DS = 2.9), [70% by w.] | Triacetin, [30% by w.] | 3.08 |
| Starch acetate 2 (DS = 2.9), [70% by w.] | Triethyl citrate, [30% by w.] | 3.03 |

The elasticity or tensility of hydroxypropyl starch acetates is clearly better than the corresponding properties of starch acetates made from native or hydrolyzed barley starch.

EXAMPLE 7

Adhesion of Hydroxyalkylated Starch Esters Onto Fibrous Materials

The adhesion of a plasticized hydroxyalkylated starch ester onto fibrous material was studied by coating board with a hydroxypropyl starch acetate plasticized with 23 w-% triacetin. The HPS acetate was prepared in the manner described in Example 2. The coating was carried out by introducing film onto the board by means of a Brabender Plasti-Corder® planar film extruder (whose geometry was 20*0,8*100 mm and slice 0,5 mm) and cooling the film between a press or nip roll and a cooling roll.

The adhesion between the coating and the board was determined as a so called tape adhesion. A 50*150 mm piece of tape was adhered onto the coating of the coated board applying a 10 N force and 5 min later the tape was manually torn off the coating. Then the degree of adhesion was determined from 0 to 5 where 0 stands for a situation where the coating was detached under the entire piece of tape and 5 indicates that the coating remained intact and adhered to the board under the entire tape area.

In the adhesion test a starch acetate like the one of Example 5 was referred to, the starch acetate having been plasticized and processed in a corresponding manner to the hydroxypropyl starch acetate. The comparison results of the adhesion properties are shown in Table 13. Table 12 indicates the properties of the starch derivatives of Table 13.

TABLE 12

Properties of the starch derivatives used

| Starch derivative | Starch base | MS | DS |
|---|---|---|---|
| Hydroxypropyl starch acetate | Native barley starch | 0.4 | 2.9 |
| Starch acetate | Hydrolyzed barley starch | — | 2.8 |

TABLE 13

Adhesion of plasticized starch derivatives onto fibrous material

| Plasticized starch derivative | Tape adhesion |
|---|---|
| Hydroxypropyl starch acetate [77% by w.] Triacetin [23% by w.] | 5 |
| Starch acetate [77% by w.] Triacetin [23% by w.] | 2 |

The adhesion of plasticized hydroxypropyl starch acetate onto board was complete as compared to the adhesion of plasticized starch acetate.

EXAMPLE 8

Defiberization of the Hydroxypropyl Starch Acetate a) A Brabender Plasti-Corder® W350E kneading mixer was used to prepare the following plasticized mixture of the hydroxypropyl starch acetate of Example 2 and triacetin:

| HPS acetate (M.S. = 0.4 and D.S. = 2.9) | 77.5 p-% |
|---|---|
| Triacetin | 22.5 p-% |

The plasticized mixture was granulated into a granular diameter of less than 2 mm using a Fritsch Pulverisette granulator.

Fibre was made from the granulated HPS acetate/triacetin mixture by the melt spinning method. The melt spinning apparatus (Fourne) comprised the following parts: extruder (screw ø 13 mm), filter, polymer pump, die (orifice ø 0.5 mm), blow pipe, air pipe, gallet and winding head. The zone temperatures in the extruder ranged between 130 and 150° C., the temperature of the polymer pump was 155° C. and the temperature of the die was 160° C. The speed of the polymer pump was 12 1/min, whereby the output was 14.4 cm$^3$/min. The spinning was begun at a gallet speed of 110 m/min and the speed was increased to 400 m/min when the process was stabilized. The diameter of the fibre produced was then about 240 µm. Outwardly, the fibre was of even quality.

b) The preparation of fibre from a mixture of starch acetate and triacetin was attempted in the corresponding manner. The mixture was plasticized in accordance with the above-mentioned method. The mixture ratio was as follows:

| Starch acetate (D.S. = 2.8) | 75% by weight |
|---|---|
| Triacetin | 25% by weight |

The mixture had a low melt strength and the material did not sustain fiberization in the melt state.

Further modification of starch acetate by propoxylation will greatly improve its melt strength, making it possible to produce fibres by the above-mentioned method.

EXAMPLE 9
Adhesion of an HPS Acetate-Cellulose Fibre Interface and the Mechanical Properties of the Composite Compared to the Corresponding Properties of a Starch Acetate/Cellulose Fibre Composite A Brabender Plasti-Corder® W350E kneading mixer was used to prepare the following plasticized mixtures comprising a starch derivative and a plasticizer and composites comprising a starch derivative, cellulose fibres and a plasticizer:

| A: | Starch acetate, D.S. = 2.79 | 75% by w. |
|---|---|---|
|  | Triacetin | 25% by w. |
| B: | HPS acetate, M.S. = 0.1, D.S. = 1.5 | 80% by w. |
|  | Triacetin | 20% by w. |
| C: | Starch acetate, D.S.= 2.79 | 55% by w. |
|  | cellulose fibres of pinewood, fibre length 2 to 3mm | 20% by w. |
|  | Triacetin | 25% by w. |
| D: | HPS acetate, M.S.= 0.1, D.S. = 1.5 | 60% by w. |
|  | cellulose fibres of pinewood, fibre length 2 to 3 mm | 20% by w. |
|  | Triacetin | 20% by w. |

Test rods were made from the mixtures and composites by means of a SP2 plunger-type die-casting machine. The dimensions of the test rod were: width 6 mm, thickness 4 mm, and length 50 mm.

The flexural strength and bending modulus of the test rods were determined by three-point bending in accordance with the standard SFS 3220 (1982). The bending distance was 35 mm and the bending rate 10 mm/in. Charpy impact strength was determined using an unnotched piece in accordance with the standard SFS-ISO 179 (1984). The test rods were kept in a sealed plastic bag (PE-LD) between manufacturing and testing.

The breaking mechanism of the composites as well as the adhesion of the fibre/matrix interface was examined using a JEOL T 100 scanning electron microscope (SEM) on the breaking surface of the test rod.

Both plasticized starch derivative mixtures (A and B) were fragile and exhibited unimpressive strength properties. By replacing part of the starch derivative with cellulose fibres (20% by w.) the mechanical properties of the mixtures could be significantly improved. When HPS acetate was used as the starch component, particularly good strength and stiffness properties were attained (Table 14). The particularly good strength and stiffness properties of the HPS acetate/cellulose fibre composite as compared to the starch acetate/cellulose fibre composite are due to the good adhesion of the fibre/matrix interface.

The good adhesion at the fibre/matrix interface allows a strong bond to be formed between the fibre and the matrix whereby the load transmitted by the matrix to the fibres is increased. At the same time the critical fibre length is reduced and the pull-out of the fibres from the matrix is reduced. Thereby the breaking mechanism of the composite is changed such that the tension does not cause the fibres to be pulled out from the matrix but to break when the tension in the fibre exceeds the maximum strength of the fibre (about 300–540 $N/mm^2$).

The breaking mechanism can be examined from SEM pictures of the fracture surface (FIGS. 1a and 1b). A number of fibre ends discontinued at the level of the fracture surface can be seen on the fracture surface of the HBP/acetate/cellulose fibre composite. Holes caused by pulled-out fibres and ends of pulled-out fibres, correspondingly, are significantly fewer in number than in the case of the starch acetate/cellulose fibre composite. The fibres protruding from the fracture surface are covered by matrix (starch derivative) which illustrates the good adhesion of the fibre/matrix interface. On the basis of SEM examination the conclusion can be drawn that the good mechanical properties, particularly the bending modulus and strength, of the HPS/acetate composite are mainly due to the good adhesion at the fibre/matrix interface.

TABLE 14

Flexural strength, bending modulus and Charpy impact resistance of the materials tested. The materials A, B, C and D are cited at the beginning of the example.

| Material/property | A | B | C | D |
|---|---|---|---|---|
| Flexural strength, [MPa] | 11.8 | 14.5 | 27.6 | 40.2 |
| Modulus, [MPa] | 800 | 1100 | 1300 | 2600 |
| Impact res., [$kj/m^2$] | 0.8 | 0.6 | 3.7 | 2.3 |

EXAMPLE 9
HPS Acetate/Triacetin/Calcium Metaphosphate Mixture

Biodegradable glass fibres were made from calcium metaphosphate glass powder by melting it in a platinum crucible having a hole in its bottom through which the molten glass was pulled to obtain fibre at a temperature of 1150° C. The fibre diameter was about 10 $\mu$m and was controlled by the rate of pulling the fibre. The fibres were subjected to avivage by drawing them through a dilute hydroxy propyl starch acetate solution prepared by the process of Example 2, and were then wound on bobbins. The fibres had a bending resistance of approximately 300 MPa and a bending modulus of 25 GPa.

Production of Composite Materials

Slightly twisted rovings of about 100 bioglass fibres were pulled through the crosshead die of the extruder while simultaneously feeding the plasticized HPS acetate (mixture B) of Example 8 in molten state into the crosshead die by means of the extruder. The bunch of fibres was impregnated by the polymer fluxing agent in the crosshead die and a cylindrical composite base having a diameter of about 0.2 mm was pulled out of the die. The composite base was cut into lengths of about 7 cm and these were compressed into rods in a cylindrical compression mould, the rods having a cylindrical cross-section and a diameter of 2 mm and a length of 6 cm. In three-point bending a bending resistance was obtained for the rods of 30 MPa. The bending strength of the corresponding rods of unstrengthened plasticized HPS acetates manufactured by injection moulding was 14.5 MPa (Example 8, mixture B).

EXAMPLE 10
HPS Acetate/Bio-Glass Fibre Composite
Plasticization of HPS Acetate The following plasticized mixture is prepared of the hydroxypropyl starch acetate of Example 2, test 10, using a Berstorff ZE25 double-screw extruder:

| HPS acetate (M.S. 0.51; D.S. 2.9) | 77% by w. |
| Triacetin | 23% by w. |

Preparation of Bio-Glass Fibre

A bio-glass rod was heated to a temperature of about 1000° C. and glass fibre (ø 200 µm) was pulled out. The fibre was directed through a PTFE die at the bottom of the melting pot. The die had a mouth diameter of 0.6 mm. The BHS acetate (granulates) was portioned to the heated pot (190° C.) where it melted and adhered to the fibre surface. The diameter of the coated fibre was about 370 µm, i.e., the coating thickness was about 85 µm. The coated fibre was mechanically strong and thus easy to process further.

Preparation and Mechanical Properties of the Continuous-Fibre Composite Consisting of Bio-Glass Fibre-HPS Acetate Approximately 90 fibres coated as described above were placed in a cylindrical compression mould. The mould was heated to 150° C. and subjected to simultaneous compressing whereby the coated fibres were sintered together forming a compact continuous-fibre reinforced rod (ø 3,4 mm). The volume fraction of the fibres in the rod was about 29% and the volume fraction of the plasticized HPS acetate used as coater/binding agent was about 71%. The flexural strength and modulus of the rods were determined by means of three-point bending. The flexural strength of the rods was 100 MPa and the bending modulus was 8 GPa.

What is claimed is:

1. A hydroxypropyl starch ester, comprising an ester group derived from acetic acid, propionic acid or butyric acid or from a mixture thereof, the molar substitution of the hydroxypropyl group being 1.4 at the most and the degree of substitution of the ester group at least 1.

2. The hydroxypropyl starch ester of claim 1, characterized in that the degree of substitution of the ester group is at least 2.

3. The hydroxypropyl starch ester of claim 2, characterized in that the molar substitution of the hydroxypropyl group is 0.1 to 0.8 and the degree of substitution of the ester group is 2.5 to 3.

4. The hydroxypropyl starch ester of claim 3, characterized in that the molar substitution of the hydroxypropyl group is about 0.3 to 0.7 and the degree of substitution of the ester group is 2.5 to 3.

5. The hydroxypropyl starch ester according to claim 1, characterized in that the ester group is derived from both long- and short-chain carboxylic acids selected from aliphatic $C_{2-24}$ carboxyl acids.

6. The hydroxypropyl starch ester of claim 5, characterized in that the ester group is derived from a saturated or an unsaturated native fatty acid.

7. The hydroxypropyl starch ester of claim 6, characterized in that the esterifying group is derived from palmitinic acid, stearic acid, oleic acid or linoleic acid or from a mixture thereof.

8. The hydroxypropyl starch ester of claim 1 derived from acetic acid, characterized in that the molar substitution of the hydroxypropyl group is 0.4 to 0.6 and the substitution of the acetate group is 2.5 to 2.95.

9. The hydroxypropyl starch ester of claim 1, characterized in that the base starch material may comprise any of several starches, native, oxidized, hydrolyzed, cross-linked, and/or cationic starch, whereby the starch has an amylose content of 0 to 100% and an amylopectin content of 0 to 100%.

10. A thermoplasticized starch component, characterized in that it contains
    60 to 90% by weight of a hydroxypropyl starch ester whose hydroxypropyl group has a molar substitution of 1.4 at the most and whose ester group has a degree of substitution of at least 1, and
    10 to 40% by weight of a plasticizer.

11. The component of claim 10, characterized in that it contains a glycerol ester of acetic acid or an alkyl ester of citric acid, or a mixture thereof as a plasticizer.

12. A thermoplasticized starch composition characterized in that it comprises the starch component of claim 10 or 11 together with additives known as such within the fields of polymer and plastics technology.

13. The composition of claim 12, characterized in that it comprises 1 to 95% by weight of biodegradable fibres.

14. The composition of claim 13, characterized in that it comprises fibres of a lactic acid-based polymer, cellulose mass, corn-based cellulose fibre material, corn-based pentosan, cotton linters, fibres of Abaca hemp, sisal fibres, ramie fibres, flax fibres, jute fibres, or biodegradable glass fibres.

15. The composition of claim 14, characterized in that it is dispersed in water.

16. The composition of claim 15, characterized in that it contains dispersion auxiliaries.

17. The composition of claim 12, characterized in that it comprises about 5 to 45% by weight of biodegradable fibres.

18. A board or paper comprising the starch component of claim 10 or 11.

19. A film comprising the starch component of claim 10 or 11.

20. An injection moulded product comprising the starch component of claim 10 or 11.

21. A fibre or nonwoven product comprising the starch component of claim 10 or 11.

22. A primer, labeling adhesive or paint component comprising the starch component of claim 10 or 11.

\* \* \* \* \*